United States Patent
Hall et al.

(10) Patent No.: US 8,738,304 B2
(45) Date of Patent: May 27, 2014

(54) SYSTEM FOR ACQUIRING DATA FROM A COMPONENT

(76) Inventors: David R. Hall, Provo, UT (US); David Wahlquist, Spanish Fork, UT (US); Davido Hyer, Provo, UT (US)

(\*) Notice: Subject to any disclaimer, the term of this patent is extended or adjusted under 35 U.S.C. 154(b) by 388 days.

(21) Appl. No.: 13/195,972

(22) Filed: Aug. 2, 2011

(65) Prior Publication Data
US 2013/0035874 A1    Feb. 7, 2013

(51) Int. Cl.
G06F 15/00    (2006.01)
B02C 18/00    (2006.01)

(52) U.S. Cl.
CPC ..................... *B02C 18/00* (2013.01)
USPC ........................................... 702/34

(58) Field of Classification Search
USPC ........................................... 702/34
See application file for complete search history.

(56) References Cited

U.S. PATENT DOCUMENTS

| | | | |
|---|---|---|---|
| 534,726 A | 9/1994 | Carroll | |
| 5,704,142 A * | 1/1998 | Stump | 37/348 |
| 2008/0101683 A1 | 5/2008 | Zombo | |
| 2011/0133923 A1* | 6/2011 | Evans et al. | 340/454 |
| 2012/0323763 A1* | 12/2012 | Michael | 705/39 |
| 2013/0131985 A1* | 5/2013 | Weiland et al. | 701/516 |

\* cited by examiner

Primary Examiner — Bryan Bui
(74) Attorney, Agent, or Firm — Philip W. Townsend, III (57) ABSTRACT

In one aspect of the present invention, a system has a data acquisition device for acquiring data from a component. The component has an identification transmitter. The data acquisition device has an image acquisition mechanism to capture an image of the component and a receiver to receive a signal from the identification transmitter. The data acquisition device also has a processor to process data from the image acquisition mechanism and the receiver.

16 Claims, 9 Drawing Sheets

SYSTEM FOR ACQUIRING DATA FROM A COMPONENT

BACKGROUND OF THE INVENTION

The present invention relates generally to the field of acquiring data about specific components. The prior art discloses several systems for acquiring data.

U.S. Patent Application No. 2008/0101683 to Zombo et al., which is herein incorporated by reference for all that it contains, discloses aspects of the invention that are directed to a visual-based system and method for non-destructively evaluating an uncoated turbine engine component. Aspects of the invention are well suited for high speed, high temperature components. Radiant energy emitted from an uncoated turbine engine component can be captured remotely and converted into a useful form, such as a high resolution image of the component. A plurality of images of the component can be captured over time and evaluated to identify failure modes. The system can also measure and map the temperature and/or radiance of the component. The system can facilitate the non-destructive evaluation of uncoated turbine components during engine operation without disassembly of the engine, thereby providing significant time and cost savings. Further, the system presents data to a user with sufficient context that allows an engine operator can evaluate the information with an increased degree of confidence and certainty.

U.S. Pat. No. 5,347,263 to Carroll et al., which is herein incorporated by reference for all that it contains, discloses low cost, compact electronic identifier apparatus interrogates a passive (no external power) or active (external power) transponder. Such identifier apparatus and transponder(s) may be used, e.g., for: (1) access control, (2) animal feeding and animal health, (3) inventory control, (4) process control, and/or (5) theft/security applications. The identifier apparatus further powers the transponder if it is passive. A power carrier signal broadcast by the identifier apparatus clocks and/or synchronizes the transponder operation. In response to being interrogated, the transponder sends back identification (ID) data. The ID data is received and extracted by the identifier apparatus in the presence of the power carrier "noise", and is then demodulated and decoded to recover the ID data. The electronic identifier apparatus uses a low cost, high speed, single chip microcontroller configured to operate so as to eliminate the use of decoders, drivers and other external circuitry.

BRIEF SUMMARY OF THE INVENTION

In one aspect of the present invention, a system has a data acquisition device for acquiring data from a component. The component has an identification transmitter. The data acquisition device has an image acquisition mechanism to capture an image of the component and a receiver to receive a signal from the identification transmitter. The data acquisition device also has a processor to process data from the image acquisition mechanism and the receiver.

The component may be used in an abrasive application and the data acquisition device may determine a useful life of the component. The component may be a wearable component. The component may be an excavation pick and a tip of the excavation pick may have a cemented metal carbide segment boded to a super hard material. The excavation pick may also have a shank attached opposite of a tip of the excavation pick and the shank may have an opening that houses the identification transmitter. The identification transmitter may be insulated from mechanical stress within the excavation pick that may result from an excavating operation. The identification transmitter may be insulated from mechanical stresses by a protective case disposed within an opening of the excavation pick. The identification transmitter may include radio frequency identification and/or be wireless.

The processor may combine data from the image acquisition mechanism and the receiver. The processor may transmit processed data to a third party. The processor may transmit unprocessed data to a third party. The third party may transmit analysis back to the data acquisition device based off the unprocessed data. The data acquisition device may be wireless. The data acquisition device may comprise a display to communicate processed data. The data acquisition device may be a phone.

The processor may determine life expectancy, failure mechanism, and wear of the component. The processor may determine the wear by generating a profile of the component from the image acquisition mechanism. The processor may also track the component and its operational status based on input from the data acquisition device.

In another aspect of the present invention, a system has a data acquisition device for determining a remaining life of a wearable component. The data acquisition device has an image acquisition mechanism to acquire an image of the wearable component. The data acquisition device also has a processor configured to determine the remaining life of the wearable component.

The wearable component may be used in an abrasive application. It may also be an excavation pick and may have a tip that has a cemented metal carbide segment bonded to a super hard material.

The data acquisition device may be a phone or may be wireless. It may have a display to communicate a result of the remaining life of the wearable component. The display may communicate the remaining life in a time unit. The display may also communicate if the wearable component needs to be replaced.

The image acquisition device may acquire multiple images of wearable components at the same time. It also may have a sensor to acquire an image of the wearable component.

The processor may determine the remaining life from a plurality of images from different angles of the wearable component. The processor may also determine the remaining life from a plurality of images from different distances from the wearable component. Furthermore, the processor may generate a three-dimensional profile from a plurality of images of the wearable component. The processor may determine the remaining life based off the three-dimensional profile. It may detect the contrast of the image to determine the boundaries of the three-dimensional profile. The contrast in the pixels of the image may also be used by the processor to determine the boundaries.

The processor may recognize distinct features of the image. The processor may also use a database to determine the remaining life of the wearable component.

DETAILED DESCRIPTION OF THE INVENTION AND THE PREFERRED EMBODIMENT

Figure 1:
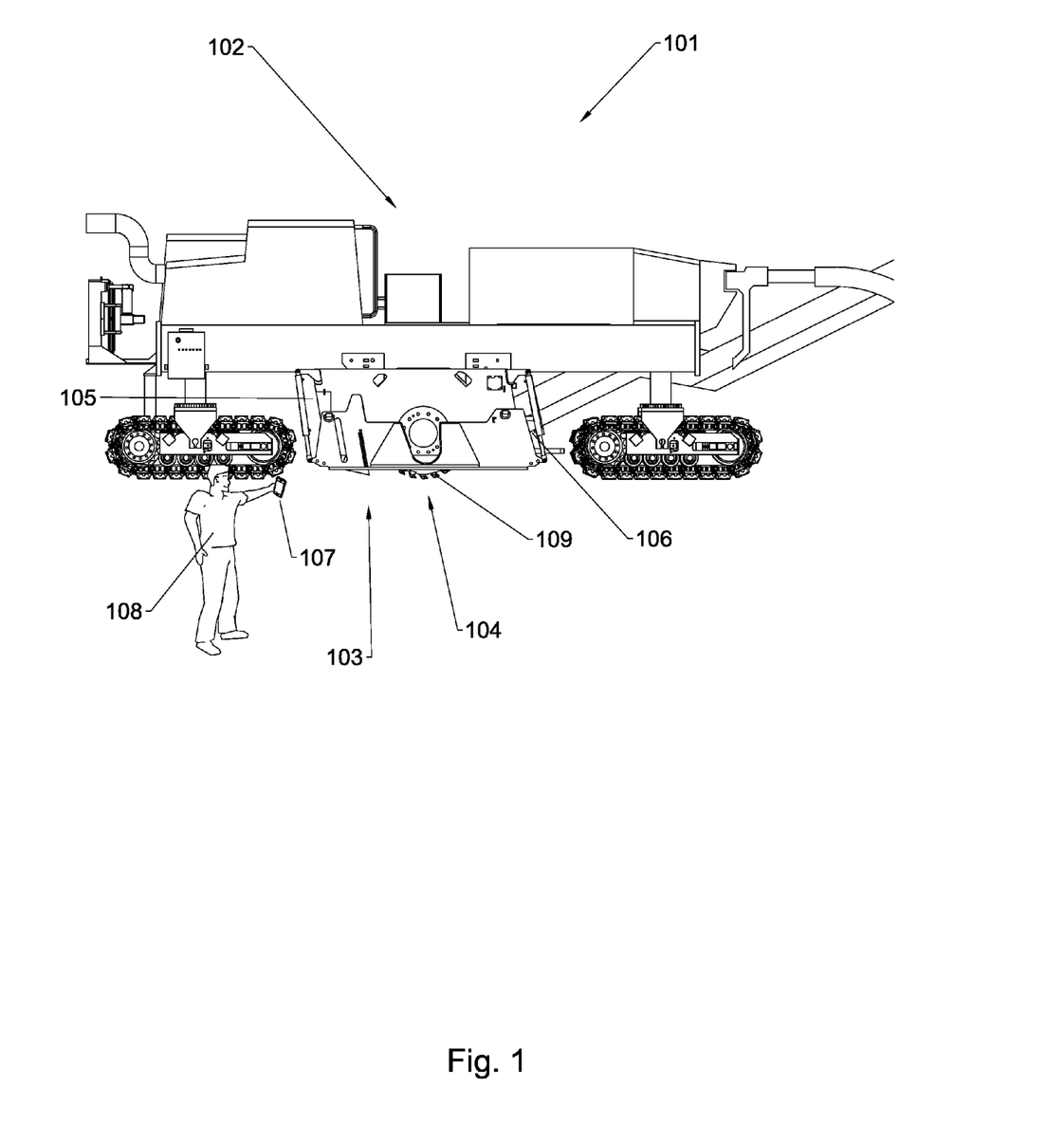
FIG. 1 is an orthogonal view of an embodiment of an excavation operation.

Referring now to the figures, FIG. 1 discloses an orthogonal view of an embodiment of an excavation operation 101. The excavation operation 101 may include an excavation machine such as a milling machine 102. The milling machine 102 may be configured to degrade a formation, such as pavement. The underside of the milling machine 102 may comprise a milling chamber 103. The milling chamber 103 may comprise a rotary degradation drum 104 comprising a plurality of excavation picks. The milling chamber 103 may also comprise a moldboard 105, a front plate 106 and side plates.

The excavation operation 101 may include a data acquisition device 107. An operator 108 may use the data acquisition device 107 to acquire data from a component. The component may be a wearable component such as an excavation pick 109.

Figure 2:
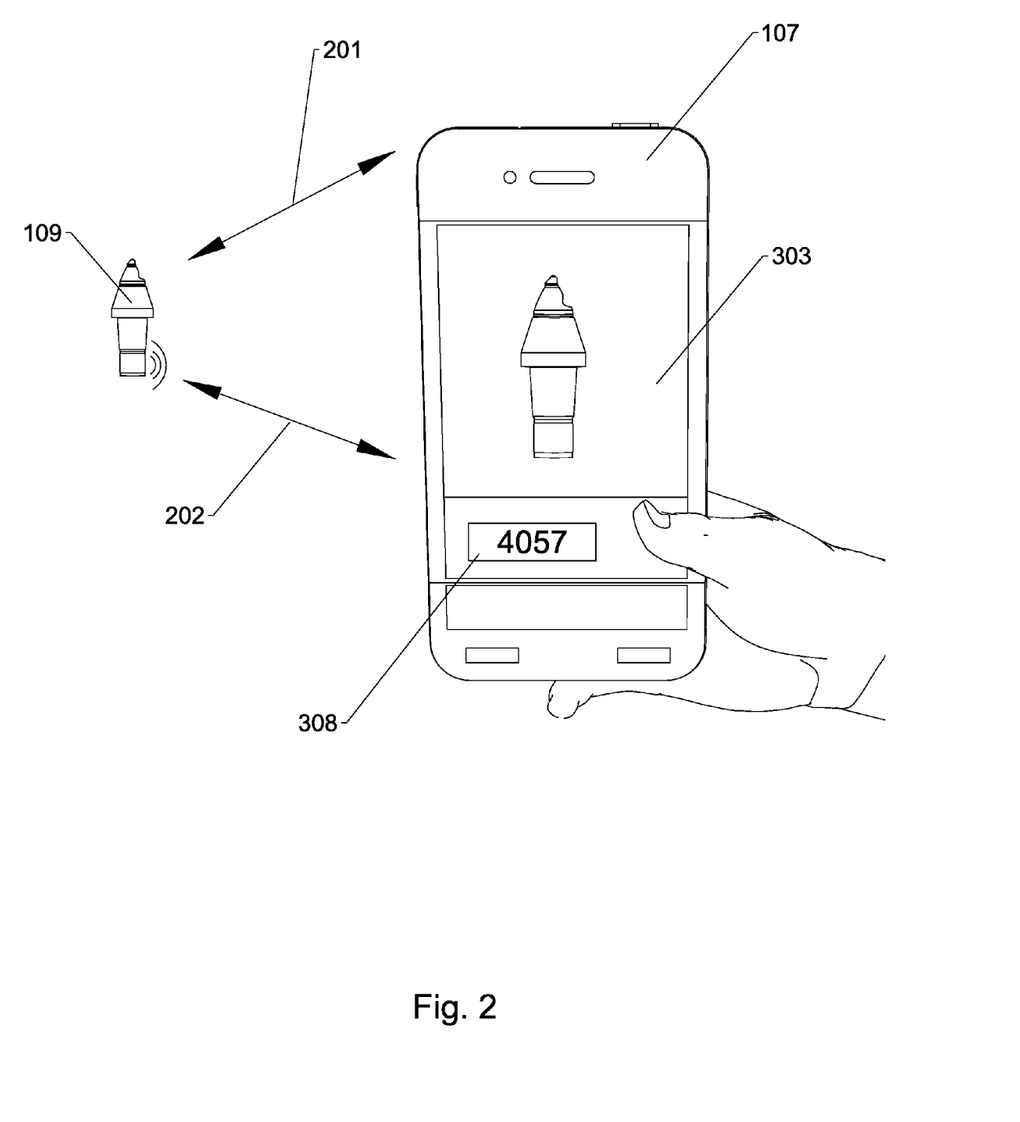
FIG. 2 is a perspective view of an embodiment of a data acquisition device.

FIG. 2 discloses a perspective view of an embodiment of the data acquisition device 107. The data acquisition device 107 may be configured to acquire data by imaging 201 and identifying 202 the excavation pick 109. The device may capture a photo image, infrared image, a pixel image, a digital image, or combinations thereof.

The data acquisition device 107 may also be configured to determine the useful life of the excavation pick 109. The data acquisition device 107 may be a phone. The phone may also comprise features that are configured to perform the analysis.

The excavation pick 109 may be configured for use in an abrasive application. Abrasive applications may include milling, drilling, or other excavation operations. The excavation pick 109 may abrade as a result of abrasive applications. It may be advantageous to determine the useful life of the excavation pick 109 in order to use it until it has reached its useful life. Discarding the excavation pick 109 before it has reached its useful life may waste materials and increase the cost of an excavation project.

The excavation pick may comprise an identification signal, such as a radio frequency identification signal that allows the data aquition device to associate the data and/or analysis with the component. An identification number 250 for the component may appear on the display 308 of the data aquistion device. Preferably, the component is capable of sending the analysis, data, and identification to emails, centralized computing systems, other electronic/computing devices. In this manner, the history of the components may be referenced to determine how long components in certain applications last. For example, the analysis may discover that the excavation picks used within a certain region or used by a certain contractor have different life expectancies. Thus, the useful remaining life calculated by the data acquisition device may be tailored to such parameters and histories that may influence the component's life.

The analysis performed by the data acquisition device may also be included as part of the component's history. Thus, analysts at a future data may associate the analysis with the correct pick when considering the factors that affect a component's life.

Figure 3:
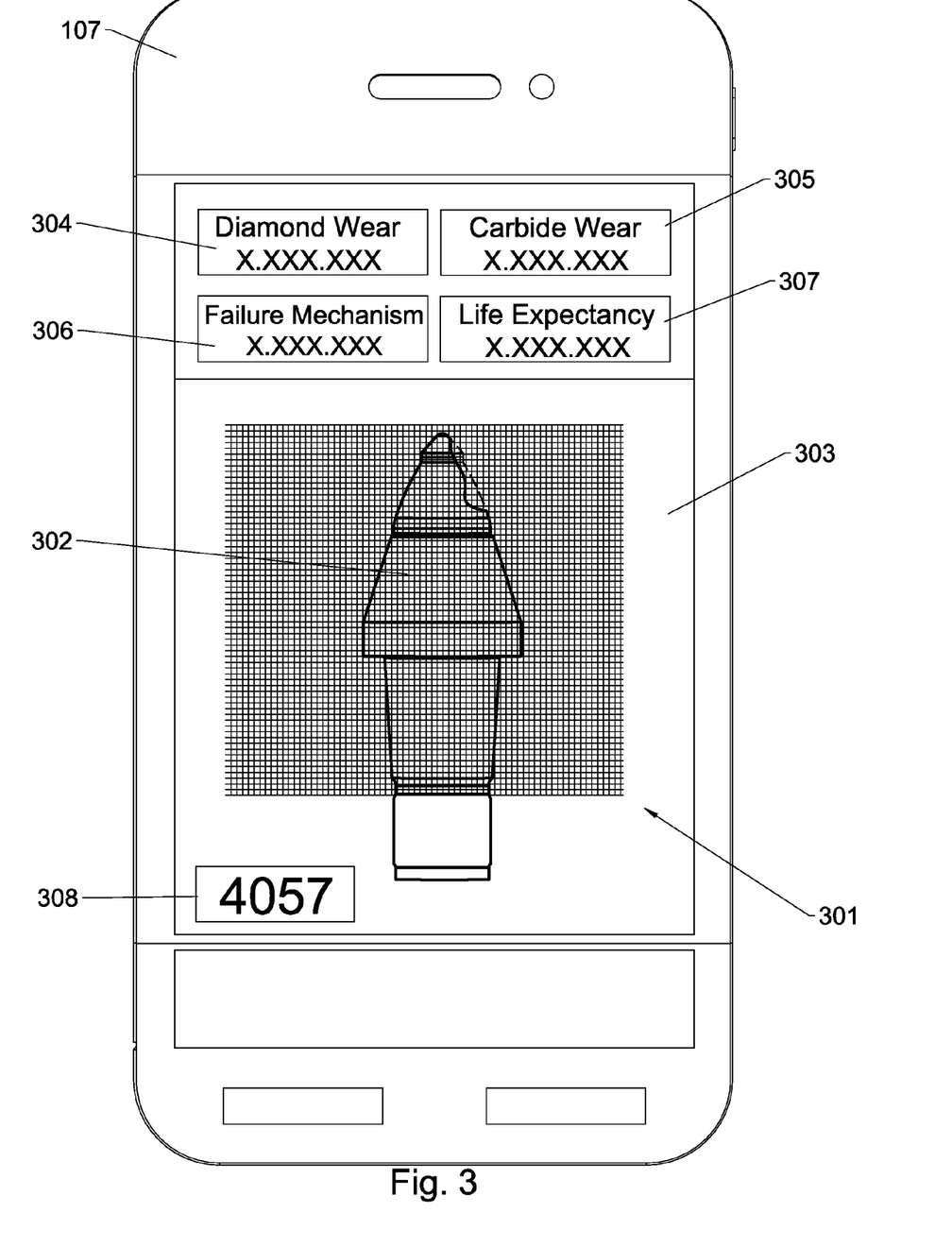
FIG. 3 is an orthogonal view of an embodiment of a data acquisition device.

FIG. 3 discloses an orthogonal view of an embodiment of the data acquisition device 107. The data acquisition device 107 may be configured to perform image analysis 301 on an image 302 of the excavation pick 109. The data acquisition device 107 may comprise a display 303. The display 303 may be configured to display analysis such as: diamond wear 304, carbide wear 305, failure mechanism 306, and life expectancy 307. The display 303 may also be configured to communicate identification 308 of the excavation pick 109.

Diamond wear 304 and carbide wear 305 analysis of the excavation pick 109 may be advantageous to perform. The excavation pick 109 may comprise a tip that has a cemented metal carbide segment bonded to a super hard material. The tip may comprise sintered polycrystalline diamond. The sintered polycrystalline diamond may be bonded to the cemented metal carbide segment at a braze joint. The cemented metal carbide segment may also be bonded to a metal section. The tip may wear at a slower rate in comparison to the rest of the excavation pick 109 due to the tip material's wear resistant properties. The tip may comprise a harder material because the tip may be the first component of the excavation pick 109 to impact a formation during an excavation operation Diamond wear 304 and carbide wear 305 analysis may determine if the excavation pick 109 has reached or passed its useful life. Diamond wear 304 and carbide wear 305 analysis may also help in the research and development of the excavation pick 109. Studying the wear of the excavation pick 109 may help improve the pick's design, track wear's progress and patterns, and avoid catastrophic failures. Improving the design may help increase the efficiency of the excavation pick 109.

The analysis of the failure mechanism 306 may be used to determine the failure mechanism 306 of an excavation pick 109. The failure of the excavation pick 109 may be caused due to manufactures defects, excavation conditions, sabotage, excavation equipment malperformance, or other factors. Excavation conditions may include: material being excavated, speed of the excavation, time spent excavating, and other factors. The failure mechanism 306 may differ from various excavation conditions. The excavation pick 109 may fail more rapidly in excavating certain materials. An excavation pick 109 may also fail due to manufactures defects. Defected excavation picks may fail before they reach their expected life. Patterns in the failure mechanism 306 may allow the manufacturer to recognize an error in the manufacturing process. It may be an economical benefit to both the consumer and manufacturer of excavation pick to recognize this error. Receiving data and providing a failure mechanism 306 for the excavation pick 109 may be advantageous to prevent a future failure mechanism 306.

When an operator inspects the excavation drum, the picks may be inspected with the assistance of the data acquisition device. The picks may be inspected while still within their drum holders or blocks or after the picks have been removed from the drums. The inspector may inspect the drum as desired, but often inspection is associated with scheduled drum maintenance or suspension that maintenance is desirable.

Understanding how a pick fails in the field may be give helpful insight to engineers to improve the pick's design. Often, engineers will develop lab tests that seek to simulate actual excavation conditions, however, lab tests often obtain different results than those obtained in the field. Thus, the data collected by the data acquisition device may give better insight into the quality of a pick.

Also, understanding the details of the failure mechanism is also important. Factors, such as, fatigue, abrasion, stress propagation, braze quality, thermal conductance, etc, affect how a pick performs in the field. However, without an understanding of the failure mechanism's details, improvements designed to reduce failures or prolong pick life are generally ineffective. One benefit of the data acquisition device is easy acquisition of the information. By acquiring an image of the failure, details, such as the smoothness of the fracture, amount of material removed, which materials were worn, the wear ratio between materials, the angle of the fracture, the location of the fracture, etc. may be recorded and analyzed quickly, and thus, reducing the man hours and likelihood that the data will be recorded.

Also, the ability to record the information in the field allows the information to be recorded more accurately because oxidation, corrosion, impacts, and other types of damage that is unrelated to excavation may occur after the picks are removed from the drum and before a technician may study the picks in a lab environment.

Also, in business models, where the picks are rented to the end users, the operators and the pick owners may have different objectives that affect the care taken to ensure that the picks may be analyzed properly. For example, the operator may wish to replace picks quickly so an excavation job may be preformed quickly, and thus, more profitably. The pick owner, may be more interested in maximizing the picks' value in both the short term and long term. Thus, the pick owner may desire a careful study of each pick instead of quickly the replacing the picks. The data acquisition device may allow for recording pertinent information without sacrificing the operator's efficiency.

The analysis of the life expectancy 307 of the excavation pick 109 may be advantageous. The cost of not using the full life of the excavation pick 109 and the cost of labor associated with stopping a project due to replacing the excavation pick 109 on a milling machine 101 may increase the cost of a project. Replacing excavation picks on a milling machine 101 may also delay the deadline of a project. Reducing the number of times that worn excavation picks are replaced may reduce cost and save time.

The data acquisition device 107 may be configured to determine the life expectancy 307 of the excavation pick 109. The data acquisition device 107 may also be configured to use data from the diamond wear 304, carbide wear 305, and failure mechanism 306 to perform this calculation. Furthermore, the data acquisition device 107 may perform analysis by using the image 302 of the excavation pick 109 to determine the wear. This may be done by using the image 302 to generate a profile of the excavation pick 109. The profile may be used to determine: diamond wear 304, carbide wear 305, pick body wear, shank wear, failure mechanism 306, and/or life expectancy 307.

The display 303 may be configured to communicate the remaining life of an excavation pick. The remaining life may be communicated in a time unit such as: days, hours, and second. Furthermore, the display may be configured to communicate whether the wearable component needs to be replaced or not.

In some embodiments, the analysis device may also automatically order picks when picks are broken or the life expectancy of a pick is short. In other embodiments, the picks may be ordered manually through the analysis device or other mechanism. In some embodiments, the analysis device, or other ordering device, may know the location of the project through a GPS or other location identifying device. As the replacement parts are ordered, the analysis device or ordering device may identify possible order destinations, such as local hotels, stores, gas stations, etc. that are within reasonable proximity to the work site. The desired destination may be selected from the group of possible destination listed. Preferably, only the estimated replacement parts are order. In this manner, the burden of managing and hauling excessive amount of parts is reduced or eliminated. Preferably, the picks are packaged in small numbers, such as four to six picks per shipment. This way, the amount of actual picks ordered may more accurately reflect the amount of picks needed.

Figure 4:
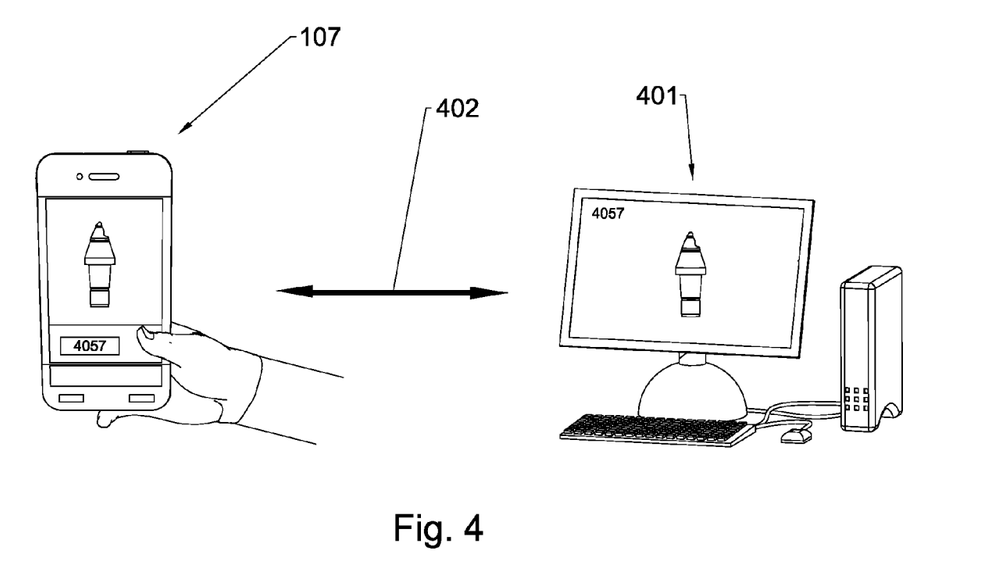
FIG. 4 is an orthogonal view of an embodiment of a data acquisition device in communication with a third party.

FIG. 4 discloses a perspective view of an embodiment of a data acquisition device 107 in communication with a third party 401. Bilateral communication 402 may occur between the data acquisition device 107 and the third party 401. Data and analysis may be exchanged between the data acquisition device 107 and the third party 401. The data acquisition device 107 and the third party may be connected through wireless capabilities.

Figure 5A:
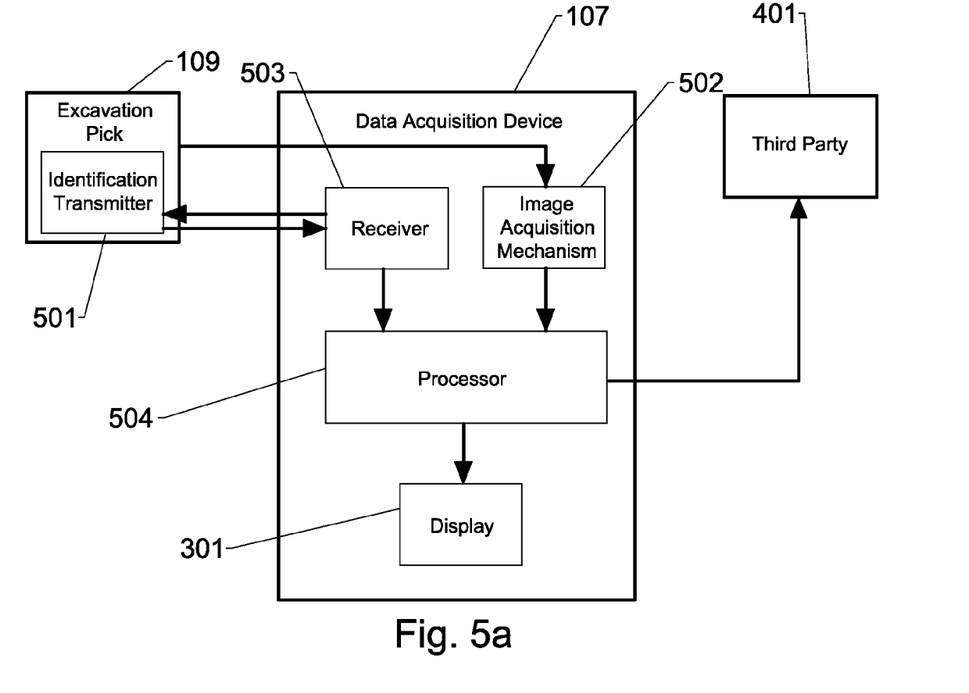
FIG. 5a is a diagram of an embodiment of processing data.

FIG. 5a discloses a chart of an embodiment of processing data. The data acquisition device 107 is configured to acquire data from an excavation pick 109. The excavation pick 109 comprises an identification transmitter 501. The data acquisition device 111 comprises of an image acquisition mechanism 502 configured to capture an image of the excavation pick 109 and a receiver 503 configured to receive a signal from the identification transmitter 501. The data acquisition device 107 comprises a processor 504 configured to process data from the image acquisition mechanism 502 and the receiver 503.

The receiver 503 may be configured to send a signal to the identification transmitter 501. The identification transmitter 501 may send an identification signal back to the receiver 503. The image acquisition mechanism 502 may acquire an image of the excavation pick 109. The image acquisition mechanism 502 may also be configured to acquire multiple images of the excavation pick 109 at the same time. The image acquisition mechanism 502 may comprise a sensor to acquire the image. The image and the identification signal may be sent to the processor 504.

The processor 504 may be configured to combine data from the image acquisition mechanism and the receiver. The image from the image acquisition mechanism 502 and the signal from the receiver 503 may be combined to be analyzed and sent to the third party 401. The third party 401 may do further study on the analysis. The processor 504 may be configured to transmit analysis to the display 303.

The processor 504 may be configured to track the excavation pick 109 and its operational status based on input from the data acquisition device 107. It may be advantageous to track the excavation pick 109 to obtain information about the excavation pick 109. The information may be the location of the excavation site and the operating conditions, which may be determined by a global positioning unit in either the pick or the data acquisition device. This information may be used to study and improve the excavation pick 109.

The processor 504 may be configured to determine the remaining life of the excavation pick 109. The remaining life may be beneficial in order to know how much longer the excavation pick 109 may be used in excavation operation. Knowing the remaining life may allow the operator 108 to decrease the amount of times to replace worn excavation picks by replacing them when they have reached their useful life. This may decrease cost by saving time and materials.

The processor 504 may be configured to determine the remaining life from a plurality of images from different angles of the excavation pick 109. The operator 108 may use the data acquisition device 107 to acquire the plurality of images of the excavation pick 109. Angles may vary when capturing images of different excavation picks. The angle at which the image is captured may not affect the ability of the processor 504 to determine the remaining life of the excavation pick 109. The processor 504 may also be configured to determine the remaining life from a plurality of images from different distances from the excavation pick 109. The distance in which the image is captured from the excavation pick 109 may vary. The distance may not affect the ability of the processor 504 to determine the remaining life of the excavation pick 109. The processor 504 may be configured to generate a three-dimensional profile from a plurality of images of the excavation pick 109. The processor may be configured to determine the remaining life of the excavation pick based off the three-dimensional profile. The processor 504 may be configured to generate the profile of the excavation pick with different methods. One method may be to use image or pixel contrast to determine the boundaries of the excavation pick 109. The processor 504 may determine the wear of the excavation pick 109 by its boundaries. Another method may be to recognize multiple features of the excavation pick 109 such as the tip and the shank. These features may be used to calculate distances and shapes from the profile. A database may also be used to compare different models of excavation picks. The processor may be configured to recognize different excavation pick models and compare wear with the database. The processor 504 may be configured to use any combination of these methods to generate the three-dimensional profile of the excavation pick 109

The processor 504 may be configured to perform economic analysis. The excavation pick 109 may be bought or rented. If rented, a consumer may rent the excavation pick 109 from a renter. After the excavation pick is utilized the excavation pick may be returned to the renter and recycled. It may advantageous for the consumer to use the excavation pick until it has reached its full useful life instead of recycling the pick prematurely. The processor may be configured to calculate economic savings. Economic savings may display the economic benefit of using the excavation pick until it has reached its useful life.

Figure 5B:
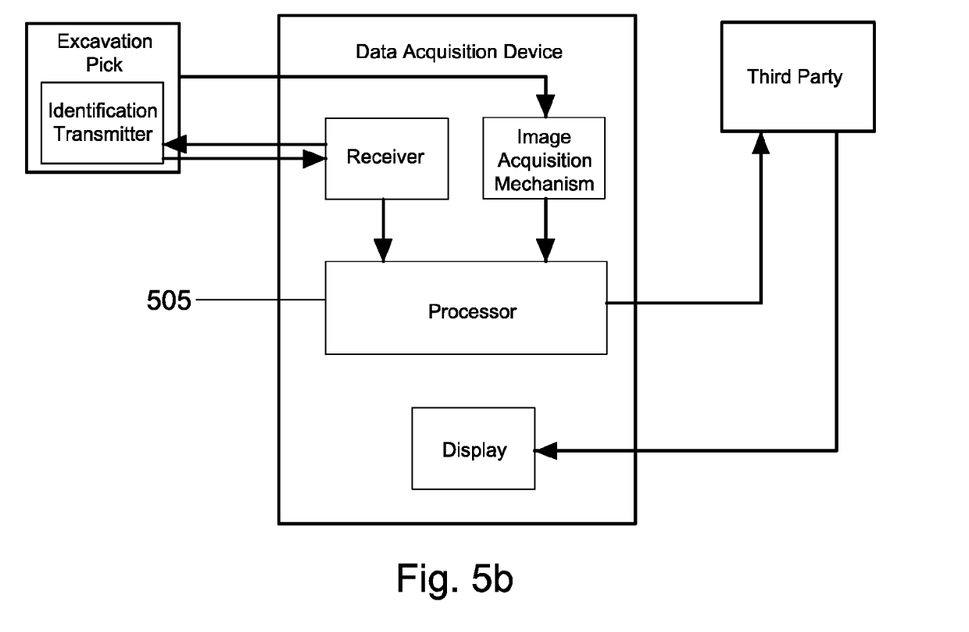
FIG. 5b is a diagram of another embodiment of processing data.

FIG. 5b discloses a chart of another embodiment of processing data. The processor 505 may be configured to transmit unprocessed data to a third party 401. In return the third party 401 may send analysis back to the data acquisition device 107 based off the unprocessed data.

Figure 6A:
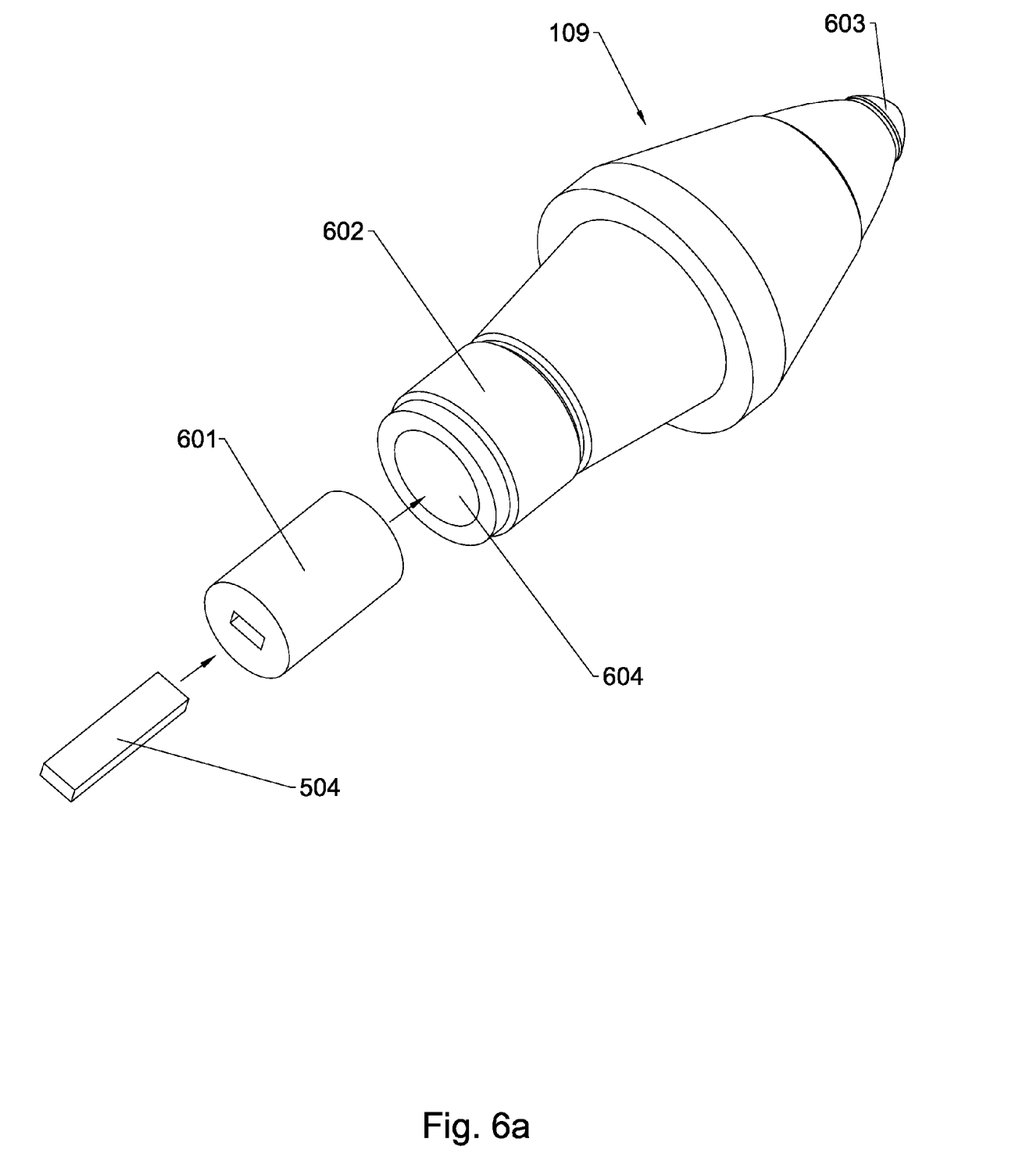
FIG. 6a is an exploded view of an embodiment of an excavation pick.

FIG. 6a discloses an exploded view of an embodiment of the excavation pick 109. The excavation pick 109 may comprise a protective case 601 and the identification transmitter 501.

The excavation pick 109 may comprise a shank 602 attached opposite of the tip 603 of the excavation pick 109; the shank 602 may comprise an opening 604 that houses the identification transmitter 501. The shank 602 may be disposed within a bore of a holder secured to a rotary degradation drum 104. The identification transmitter 501 may be configured to be insulated from mechanical stress within the excavation pick 109 that may result from an excavating operation. The identification transmitter 501 may be insulated from the mechanical stresses by a protective case 601 disposed within the opening 604 of the excavation pick 109.

The protective case 601 may be made of an impact absorbent material. The impact absorbent material may absorb impact caused by the excavation pick 109 impacting a formation during an excavation operation. The protective case 601 may be made of an elastic material that suspends the identification transmitter 504. Forces caused by excavation operations may create a load that is distributed throughout the excavation pick 109 and the degradation drum 104. The load may pass through the excavation pick 109 to the degradation drum 104. The identification transmitter 504 may be surrounded by the impact absorbent material to prevent the identification transmitter 504 from coming into contact with the inner wall of the shank 602 during excavation operations and becoming damaged.

An identification transmitter 501 may be attached to the excavation pick 109 in different ways. The identification transmitter 501 may be embedded within the excavation pick 109 or attached to the outside of the excavation pick 109 with an adhesive.

The identification transmitter 501 may use radio frequency identification technology. Each identification transmitter 501 may have a unique identification serial number to identify the excavation pick 109. A radio signal may be sent to the identification transmitter 501 and a replying signal may comprise an identification serial number. It may be advantageous to track the excavation pick 109 in order to know information such as location and operation conditions.

Figure 6B:
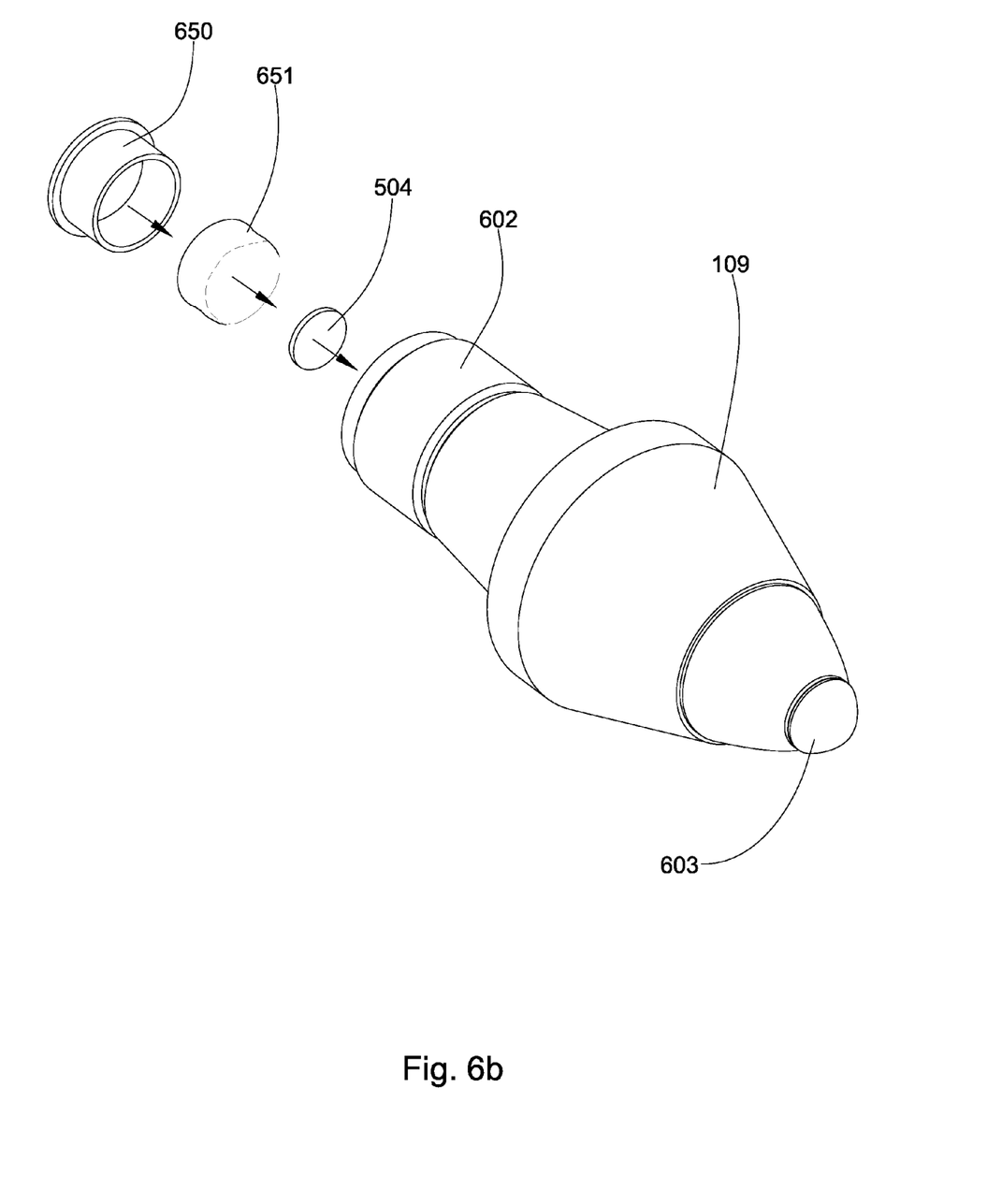
FIG. 6b is an exploded view of another embodiment of an excavation pick.

FIG. 6b discloses a cap 650 and spacer 651 that may also be inserted into the shank's opening. These components may further protect the processor 504 or any other components in the opening from debris, water, grease, dust, or substances from affecting the processor.

Figure 7:
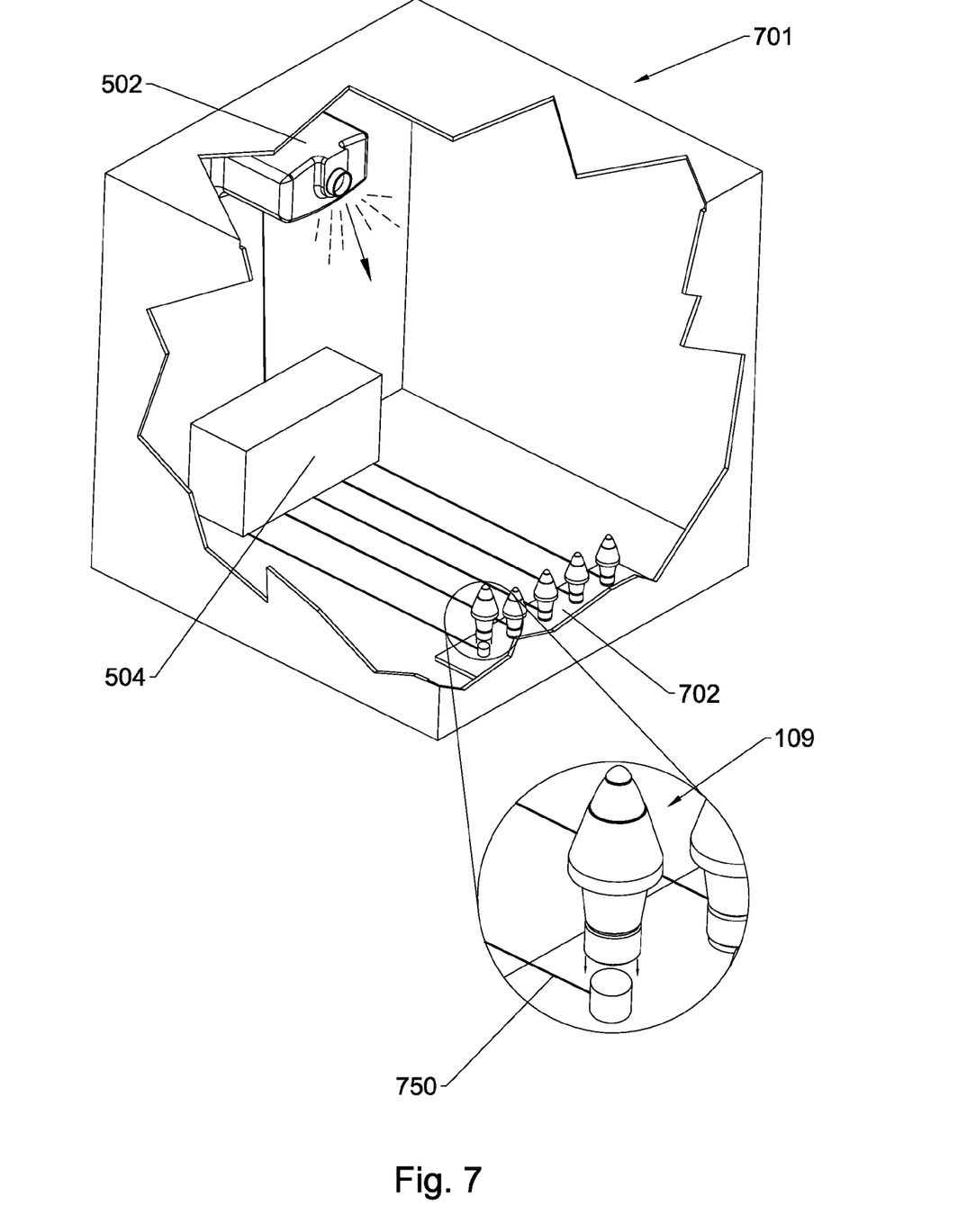
FIG. 7 is a perspective view of another embodiment of a data acquisition device.

FIG. 7 discloses a perspective view of an embodiment of a data acquisition device 701. The data acquisition device 701 may be inside an enclosed structure. The data acquisition device 701 may comprise an image acquisition mechanism 503, a processor 504, and an array 702.

The data acquisition device 701 may be configured to have the excavation pick 109 placed on the array 702 to perform analysis. The array 702 may be connected to the processor 504 by wiring. Wiring may connect each individual excavation pick 109 to the processor 504. Each excavation pick 109 in the array 702 may be configured to transmit a signal through the wire from the identification transmitter 501 to the processor 504. The image acquisition device 502 may be connected to the processor 504 with hard wiring 750. The processor 504 may analyze the excavation pick 109 and transmit analysis to a third party 401.

The data acquisition device may be fixed within the structure. Thus, the data aquistion device may capture the image of the pick at a consistent angle or angles. In this manner, the alogrythms for determining the life expectancy or failure mode of the pick may be simplified. In other embodiments, multiple data acquisition devices may be secured within the structure and may aquire multiple images of the pick from different angles. The data acquisition device may be configured to integrate the multiple images together for analysis.

Figure 8:
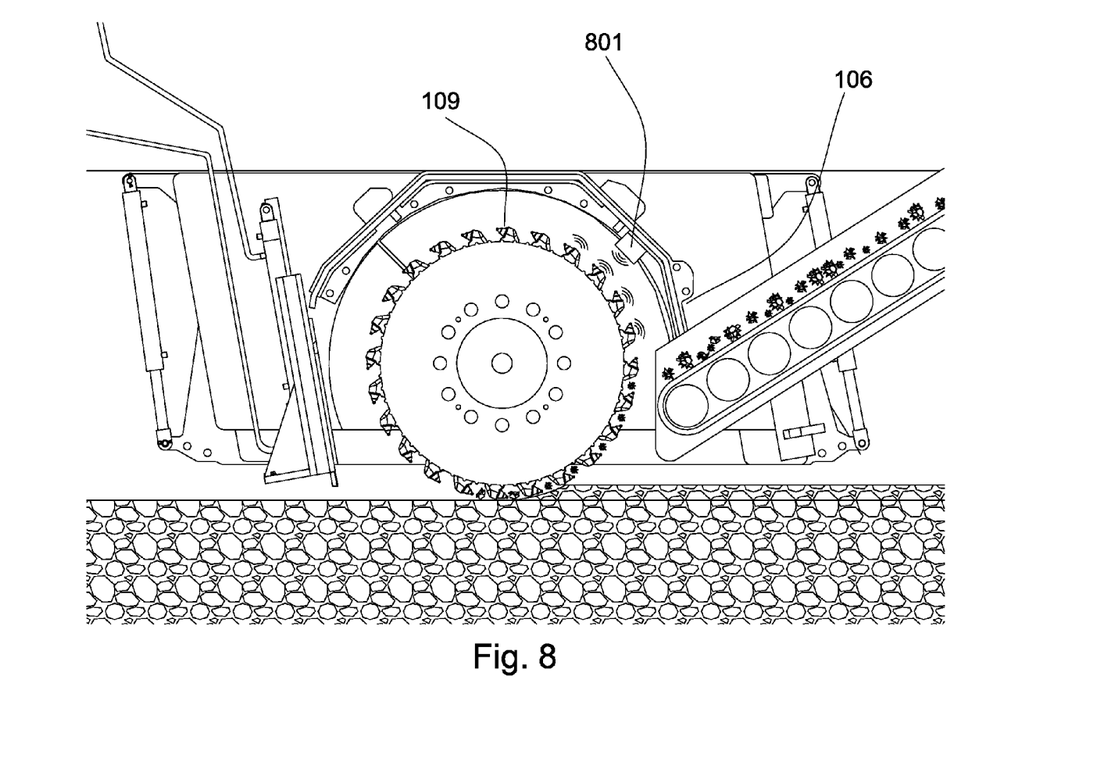
FIG. 8 is an orthogonal view of an embodiment of an excavation operation.

FIG. 8 discloses an orthogonal view of an embodiment of a data acquisition device 801 that is located in a milling chamber 103. In the embodiment of FIG. 8, the data acquisition device is located toward the front plate 106 of the milling machine 102. The data acquisition device 801 may be in wireless communication with excavation picks and may be used to track each individual excavation pick 109. An operator may merely secure each pick to the drum without recording which picks where chosen for operation. As the picks get within wireless range of the data acquisition device, the indentification numbers are recorded. Also, when a pick is removed, the data acquisition device may notice that the pick's electronics no longer respond to the device's inquiries, thus, the device stops recording that the pick is secured to the drum. The data acquisition device may send periodic inquires to the picks to more accurately record their presence.

In some embodiments, the wireless range is only within a few feet. The inquiries from the data acquisition device may also be blocked by the metal of the moldboard, side plates, front plates, and excavating drum. Thus, the picks may be identified as the picks rotate with the drum and come within the quadrant of the excavating chamber occupied by the data acquisition device.

The pick track mechanism 801 may also be connected to a global positioning system. Connecting to a global positioning system may provide global coordinates. The global coordinates may use the location of an excavation operation to study the wear of the excavation pick 109.

The data acquisition device 801 may be in communication with the motor that drives the excavating drum and other equipment controlling the excavating machine. Information such as the motor's operating times, torque, rotational velocity, depth of cut, shocks on the excavation machine, amount of water dispensed within the excavating chamber, etc. may be associated with each pick secured to the drum. This recorded information may be used combined to the picks history and may be transmitted to a $3^{rd}$ party. The $3^{rd}$ party may store the data until a future time or may process the data as the picks are being used.

In some embodiments, the picks comprise sensors that may indicate a condition of the pick, such as whether the pick is plastically deformed, broken, is rotating within the blocks or holders properly, overheating, abraded away, etc. Data from these sensors may be received by the data acquisition device, which may send a message to an operator to discontinue excavating as appropriate.

The data acquisition device may also be equipped with an accelerometer. Measurements from the accelerometer may record the shocks and vibrations of the excavation operation and associate these events and/or conditions with the identified picks for further research and development.

While the present invention has been described as the component being an excavation pick on milling machine, the present invention may be incorporated in other applications that involve wear. For example, other excavation applications that may be well suited for the present invention include trenching, concrete milling, asphalt milling, underground mining, open pit mining, oil drilling, horizontal drilling, water well drilling, and so forth. However, other components that may incorporate the present invention include jaw crushers, cone crushers, chain saws, impacters, hammer mills, mulchers, tires, brakes, rotary saws, and so forth.

Whereas the present invention has been described in particular relation to the drawings attached hereto, it should be understood that other and further modifications apart from those shown or suggested herein, may be made within the scope and spirit of the present invention.

What is claimed is:

1. A wear measurement system, comprising:
a wear component which is an excavation pick;
the wear component comprising an identification transmitter insulated from mechanical stress within the excavation pick;
an image acquisition mechanism to capture an image of the wear component;
a receiver to receive a signal from the identification transmitter; and
a processor to process data from the image acquisition mechanism and the receiver.

2. The system of claim 1, wherein the processor determines a useful life of the wear component.

3. The system of claim 1, wherein the excavation pick comprises a shank diametrically opposed a tip and the identification transmitter is disposed within an opening in the shank.

4. The system of claim 1, wherein the identification transmitter is insulated from mechanical stress by a protective case disposed within an opening of the excavation pick.

5. The system of claim 1, wherein the processor transmits processed data to a third party via an interfacing module.

6. The system of claim 1, further comprising a display to communicate processed data.

7. The system of claim 1, wherein the processor transmits unprocessed data to a third party via an interfacing module.

8. The system of claim 7, wherein the third party transmits processed data back to the processor via the interfacing module.

9. The system of claim 1, wherein the processor determines a failure mechanism of the wear component.

10. The system of claim 1, wherein the processor determines condition wear of the wear component.

11. The system of claim 10, wherein the processor determines wear by generating a profile of the wear component from the image acquisition mechanism.

12. The system of claim 1, wherein the processor tracks the operational status of the wear component.

13. The system of claim 1, wherein the processor is part of a mobile phone.

14. The system of claim 1, wherein the identification transmitter includes radio frequency identification.

15. The system of claim 1, wherein the identification transmitter is wireless.

16. The system of claim 1, further comprising an ordering mechanism that identifies ordering destinations proximate a worksite that uses the wear component.

* * * * *